US007002474B2

(12) United States Patent
De Souza et al.

(10) Patent No.: US 7,002,474 B2
(45) Date of Patent: Feb. 21, 2006

(54) RADIO FREQUENCY IDENTIFICATION (RFID) TAG AND A METHOD OF OPERATING AN RFID TAG

(75) Inventors: Kenneth G. De Souza, Kitchener (CA); James W. D. Fare, Waterloo (CA); Sean Woodward, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/197,389

(22) Filed: Jul. 17, 2002

(65) Prior Publication Data

US 2004/0012496 A1    Jan. 22, 2004

(51) Int. Cl.
    *G08B 13/14* (2006.01)
(52) U.S. Cl. .............................. 340/572.3; 340/572.1; 340/572.7; 340/5.41; 340/5.86
(58) Field of Classification Search ............. 340/572.1, 340/572.3, 574.4, 572.7, 572.8
    See application file for complete search history.

(56) References Cited

U.S. PATENT DOCUMENTS

| | | | | | |
|---|---|---|---|---|---|
| 3,810,147 | A | * | 5/1974 | Lichtblau ................. | 340/572.3 |
| 5,528,222 | A | * | 6/1996 | Moskowitz et al. ..... | 340/572.7 |
| 5,572,226 | A | * | 11/1996 | Tuttle ........................ | 343/726 |
| 5,574,431 | A | * | 11/1996 | McKeown et al. ...... | 340/572.3 |
| 5,874,902 | A | * | 2/1999 | Heinrich et al. .......... | 340/10.51 |
| 5,963,144 | A | * | 10/1999 | Kruest ........................ | 340/10.1 |
| 6,008,727 | A | * | 12/1999 | Want et al. ............... | 340/572.1 |
| 6,025,780 | A | * | 2/2000 | Bowers et al. ............ | 340/572.3 |
| 6,102,290 | A | * | 8/2000 | Swartz et al. ........... | 235/462.01 |
| 6,104,281 | A | * | 8/2000 | Heinrich et al. ........... | 340/10.5 |
| 6,335,685 | B1 | * | 1/2002 | Schrott et al. ............ | 340/572.1 |
| 6,359,562 | B1 | * | 3/2002 | Rubin ...................... | 340/572.3 |
| 6,525,329 | B1 | * | 2/2003 | Berman ...................... | 250/556 |
| 2002/0005774 | A1 | * | 1/2002 | Rudolph et al. ........... | 340/5.61 |
| 2002/0170973 | A1 | * | 11/2002 | Teraura ...................... | 235/492 |

\* cited by examiner

*Primary Examiner*—Daniel Wu
*Assistant Examiner*—Son Tang
(74) *Attorney, Agent, or Firm*—Michael Chan

(57) ABSTRACT

A radio frequency identification (RFID) tag comprises RFID circuitry, an antenna, and a detector responsive to electromagnetic radiation of a predetermined frequency and for controlling cooperation between the RFID circuitry and the antenna when electromagnetic radiation of the predetermined frequency is detected. The detector may be responsive to light of the predetermined frequency to enable cooperation between the RFID circuitry and the antenna when light of the predetermined frequency is detected. Alternatively, the detector may be responsive to light of the predetermined frequency to disable cooperation between the RFID circuitry and the antenna when light of the predetermined frequency is detected.

10 Claims, 3 Drawing Sheets

FIG. 1

RADIO FREQUENCY IDENTIFICATION (RFID) TAG AND A METHOD OF OPERATING AN RFID TAG

BACKGROUND OF THE INVENTION

The present invention relates to radio frequency identification (RFID) systems, and is particularly directed to an RFID tag and a method of operating an RFID tag.

RFID tags and their construction and operation are well known. A typical RFID tag includes RFID circuitry and an antenna by which signals are received from or transmitted to an RFID reader located within the operating range of the RFID tag. During operation, the RFID circuitry receives a signal communicated from the RFID reader and generates a signal which is communicated back to the RFID reader.

In some RFID tag applications, there is usually more than one RFID tag generating its signal which is communicated back to the RFID reader. Since multiple signals are being communicated back to the RFID reader, collisions may occur resulting in potential data loss. Anticollision techniques have been applied to differentiate between signals received from two or more RFID tags. A drawback in known anticollision techniques is that signals from only a limited number of different RFID tags can be differentiated.

It would be desirable to be able to differentiate signals received from a relatively large number of RFID tags which are located within a limited physical area and within the operating range of the RFID reader. For example, it would be desirable to differentiate signals received from RFID tags contained in a relatively large stack of bank checks in which each bank check has a corresponding RFID tag associated therewith.

SUMMARY OF THE INVENTION

In accordance with one aspect of the present invention, a radio frequency identification (RFID) tag comprises a device for disabling operation of the RFID tag when the device detects electromagnetic radiation of a predetermined frequency. The device may detect light of the predetermined frequency and disables operation of the RFID tag when light of the predetermined frequency is detected.

In accordance with another aspect of the present invention, a radio frequency identification (RFID) tag comprises RFID circuitry, an antenna, and means responsive to electromagnetic radiation of a predetermined frequency and for controlling cooperation between the RFID circuitry and the antenna when electromagnetic radiation of the predetermined frequency is detected. The means may include means responsive to light of the predetermined frequency and for enabling cooperation between the RFID circuitry and the antenna when light of the predetermined frequency is detected. Alternatively, the means may include means responsive to light of the predetermined frequency and for disabling cooperation between the RFID circuitry and the antenna when light of the predetermined frequency is detected.

In accordance with still another aspect of the present invention, a method of operating a radio frequency identification (RFID) tag comprises the steps of detecting light of a predetermined frequency, and enabling operation of the RFID tag when light of the predetermined frequency is detected.

In accordance with yet another aspect of the present invention, a method of operating a radio frequency identification (RFID) tag comprises the steps of detecting light of a predetermined frequency, and disabling operation of the RFID tag when light of the predetermined frequency is detected.

In accordance with another aspect of the present invention, a check comprises sheet material, and a radio frequency identification (RFID) tag disposed on the sheet material. The RFID tag includes means for (i) detecting electromagnetic radiation of a predetermined frequency, and (ii) enabling operation of the RFID tag when electromagnetic radiation of the predetermined frequency is detected.

In accordance with still another aspect of the present invention, a check comprises sheet material, and a radio frequency identification (RFID) tag disposed on the sheet material. The RFID tag includes means for (i) detecting electromagnetic radiation of a predetermined frequency, and (ii) disabling operation of the RFID tag when electromagnetic radiation of the predetermined frequency is detected.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a diagram of a check having a radio frequency identification (RFID) tag;

DETAILS OF THE INVENTION

Figure 1:
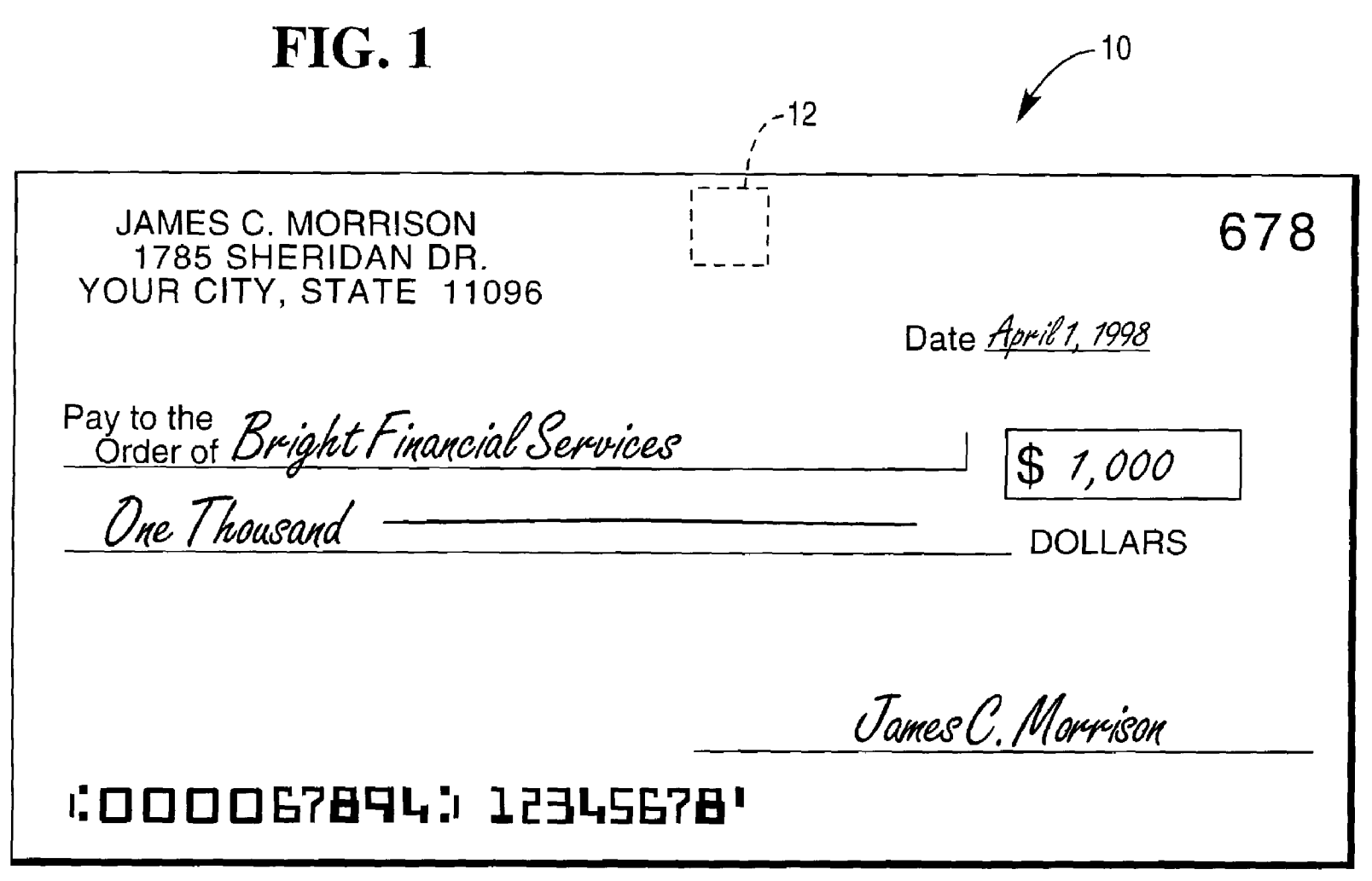

The present invention is directed to a radio frequency identification (RFID) tag and a method of operating an RFID tag. As shown in FIG. 1, a check 10 has an RFID tag 12 associated therewith. The RFID tag 12 may be disposed on a major side surface of the check 10. Preferably, the RFID tag 12 is embedded into the sheet material of the check 10 during manufacture of the check 10.

Figure 2:
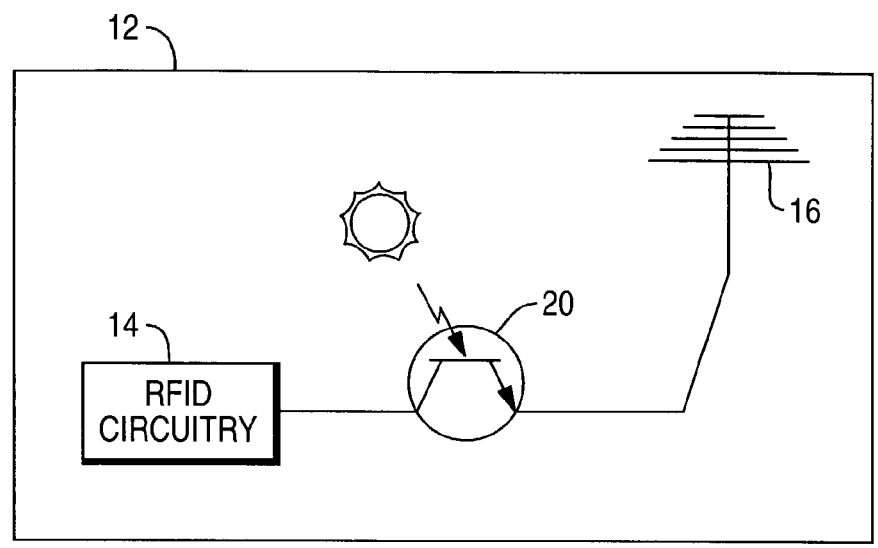
FIG. 2 is a schematic diagram of the RFID tag of FIG. 1 and showing a first embodiment of the present invention.

Referring to FIG. 2, the RFID tag 12 includes RFID circuitry 14 and an RFID antenna 16, as is known. The circuitry 14 typically includes a printed circuit board on which electronic components are mounted. The antenna 16 may be of the inductive loop type, for example. The structure and operation of the circuitry 14 and the antenna 16 are well known and, therefore, will not be described.

As shown in FIG. 2, a phototransistor 20 is electrically connected between the circuitry 14 and the antenna 16. More specifically, the collector terminal of the phototransistor 20 is connected to the circuitry 14 and the emitter terminal of the phototransistor is connected to the antenna 16. It is conceivable that in some applications, it may be desirable to connect the collector terminal of the phototransistor 20 to the antenna 16 and the emitter terminal of the phototransistor 20 to the circuitry 14. The base terminal of the phototransistor 20 is responsive to electromagnetic radiation of a predetermined frequency, such as a beam of light of the predetermined frequency.

When no light of the predetermined frequency is detected at the base terminal of the phototransistor 20, the phototransistor is turned OFF and there is an open electrical connection between the circuitry 14 and the antenna 16. When a sufficient intensity of light of the predetermined frequency is detected at the base terminal of the phototransistor 20, the phototransistor is turned ON and there is a is a closed electrical connection between the circuitry 14 and the antenna 16. Thus, the RFID tag 12 is operative when light of the predetermined frequency is detected at the base terminal of the phototransistor 20, and is inoperative when no light of the predetermined frequency is detected at the base terminal of the phototransistor 20.

Figure 3:
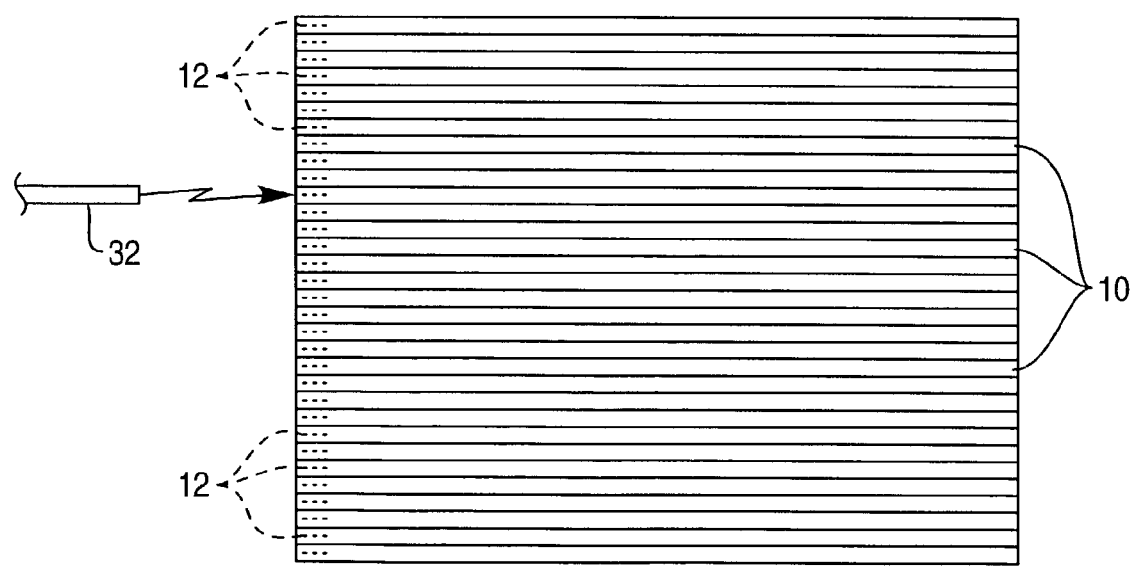
FIG. 3 is a diagram of a stack of checks like the check of FIG. 1.

It should be apparent that the phototransistor 20 functions as a switch to enable and disable operation of the RFID tag 12, depending upon whether or not light of the predetermined frequency is detected at the base terminal of the phototransistor 20. This switching feature allows signals from a large number of RFID tags in a relatively small physical area to be easily differentiated. For example, as shown in FIG. 3, there may be a large stack 30 of checks like the check 10 of FIG. 1. Signals from the checks contained in the stack 30 of checks are easily differentiated because a beam of light of the predetermined frequency from a laser device 32 is directed to only one or only a small number of RFID tags of the checks at any given time. As shown in FIG. 3, the beam of light of the predetermined frequency from the laser device 32 is being directed to only one RFID tag at the particular time.

Although the above description describes the check 10 having an RFID tag 12 located approximately along the top edge portion of the main face of the check as shown in FIG. 1, it is conceivable that the RFID tag 12 be positioned at any location associated with the check 10 so long as a beam of light is able to turn ON the phototransistor 20.

Also, although the above description describes the phototransistor 20 as being separate from the circuitry 14 and the antenna 16, it is contemplated that the phototransistor may be integrated with either the circuitry or the antenna. Moreover, it is conceivable that the circuitry 14 and the antenna 16 be integrated. Accordingly, it is conceivable that the phototransistor 20, the circuitry 14, and the antenna 16 be integrated.

Figure 4:
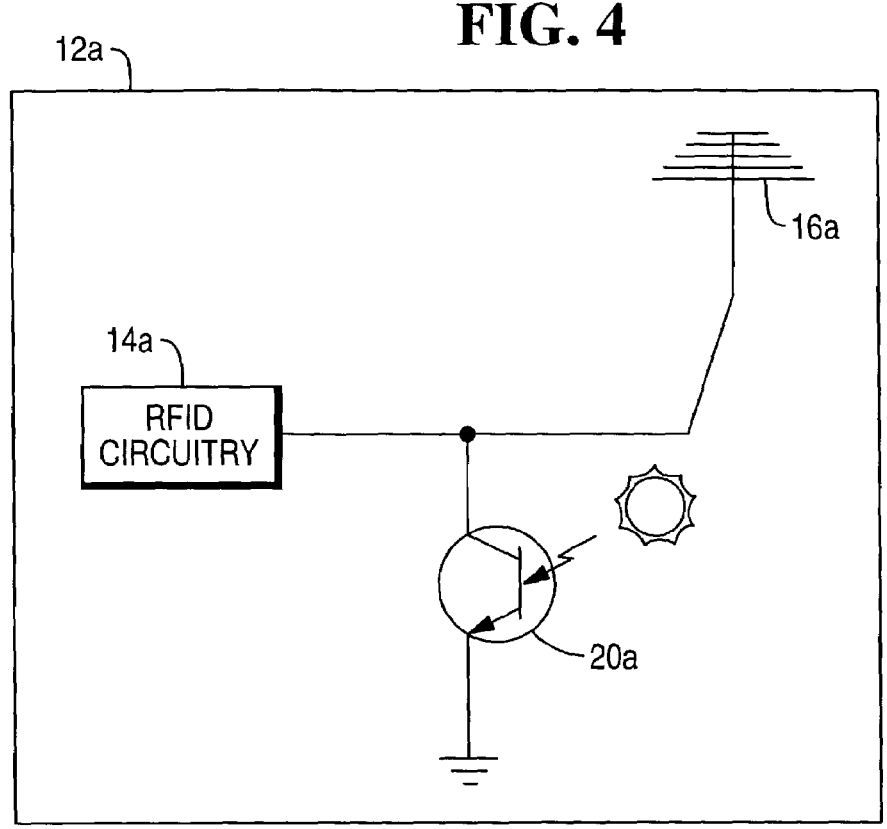
FIG. 4 is a schematic diagram similar to the schematic diagram of FIG. 2 and showing a second embodiment of the present invention.

A second embodiment of the present invention is illustrated in FIG. 4. Since the embodiment of the invention illustrated in FIG. 4 is generally similar to the embodiment illustrated in FIG. 2, similar numerals are utilized to designate similar components, the suffix letter "a" being associated with the embodiment of FIG. 4 to avoid confusion.

In the embodiment of FIG. 4, the collector terminal of the phototransistor 20a is connected to the RFID circuitry 14a and the antenna 16a. The emitter terminal of the phototransistor 16a is connected to ground potential. When no light of a predetermined frequency is applied to the base terminal of the phototransistor 20a, the phototransistor is turned OFF and there is an open electrical connection between the collector and emitter terminals of the phototransistor. In this case, the RFID circuitry 14a and the antenna 16a are cooperatively connected to each other. When a sufficient intensity of light of the predetermined frequency is applied to the base terminal of the phototransistor 20a, the phototransistor is turned ON and there is a is a closed electrical connection between the collector and emitter terminals of the phototransistor. In this case, the RFID circuitry 14a and the antenna 16a are both grounded and not cooperatively connected to each other. Thus, the RFID tag 12a is inoperative when light of the predetermined frequency is detected at the base terminal of the phototransistor 20a, and is operative when no light of the predetermined frequency is detected at the base terminal of the phototransistor 20.

Figure 5:
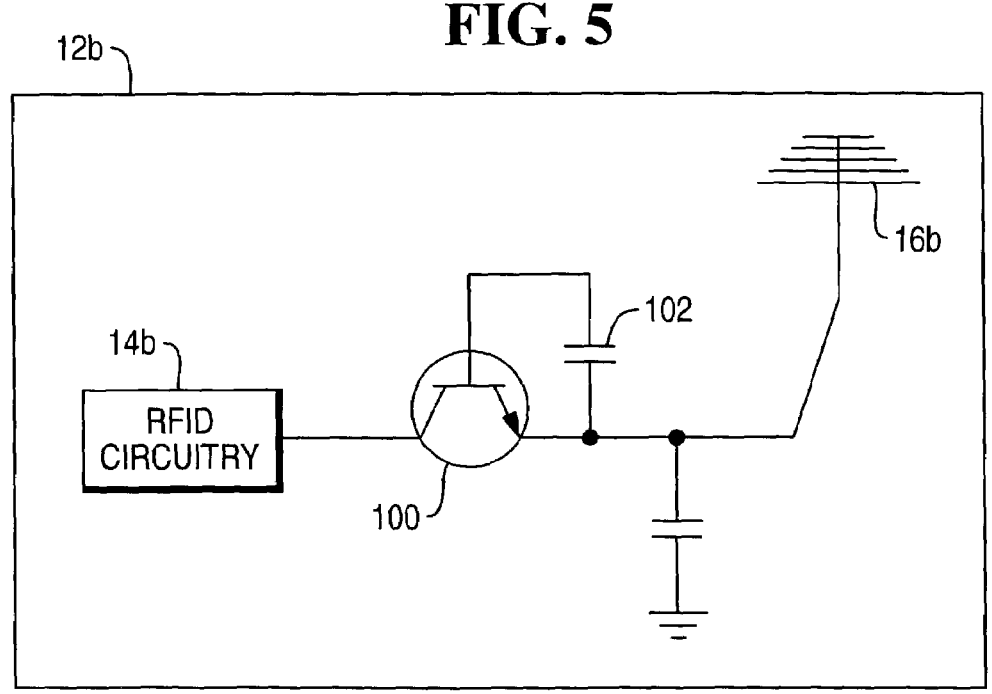
FIG. 5 is another schematic diagram similar to the schematic diagram of FIG. 2 and showing a third embodiment of the present invention.

A third embodiment of the present invention is illustrated in FIG. 5. Since the embodiment of the invention illustrated in FIG. 5 is generally similar to the embodiment illustrated in FIG. 2, similar numerals are utilized to designate similar components, the suffix letter "b" being associated with the embodiment of FIG. 5 to avoid confusion.

In the embodiment of FIG. 5, the collector terminal of a transistor 100 is connected to the RFID circuitry 14b. The emitter terminal of the transistor 100 is connected to the antenna 16b. A capacitor 102 is connected across the base and emitter terminals of the transistor 100. The capacitance of the capacitor 102 is selected such that the transistor turns ON in response to a tuned frequency received on the antenna 16b. This tuned frequency at which the transistor 100 turns ON is different from the interrogating frequency associated with operation of the RFID tag 12b. When no electromagnetic radiation of the tuned frequency is received at the antenna 16b and detected at the base terminal of the transistor 100, the transistor is turned OFF and there is an open electrical connection between the base and emitter terminals of the transistor. In this case, the RFID circuitry 14b and the antenna 16b are not cooperatively connected to each other. When electromagnetic radiation of sufficient intensity of the tuned frequency is received at the antenna 16b and detected at the base terminal of the transistor 100, the transistor is turned ON and there is a closed electrical connection between the collector and emitter terminals of the transistor. In this case, the RFID circuitry 14b and the antenna 16b are cooperatively connected to each other. Thus, the RFID tag 12b is operative when electromagnetic radiation of the tuned frequency is detected at the base terminal of the transistor 100, and is inoperative when no electromagnetic radiation of the tuned frequency is detected at the base terminal of the transistor.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A check comprising:
   sheet material; and
   a radio frequency identification (RFID) tag embedded in the sheet material during manufacture of the check, the RFID tag inchiding (i) RFID circuitry other than circuitry external to the RFID tag, (ii) an antenna connectable to the RFID circuitry and for receiving an interrogating signal of an interrogating frequency from an interrogating source, and (iii) activatable means for, when activated in response to detecting electromagnetic radiation of a predetermined frequency which is different from the interrogating frequency of the interrogating signal, interconnecting the RFID circuitry and the antenna to allow the RFID circuitry to receive the interrogating signal from the interrogating source so as to enable operation of the RFID tag.

2. A check according to claim 1, wherein the activatable means includes a phototransistor which turns ON in response to detecting a beam of light of the predetermined frequency which is different from the interrogating frequency of the interrogating signal.

3. A check according to claim 1, wherein the activatable means includes a transistor which turns ON in response to the antenna receiving a tuned frequency which is of the predetermined frequency which is different from the interrogating frequency of the interrogating signal.

4. A check comprising:
sheet material; and
a radio frequency identification (RFID) tag embedded in the sheet material during manufacture of the check, the RFID tag including (i) RFID circuitry other than circuitry external to the RFID tag, (ii) an antenna connectable to the RFID circuitry and for receiving an interrogating signal of an interrogating frequency from an interrogating source, and (iii) activatable means for, when activated in response to detecting electromagnetic radiation which is from a source external to the RFID tag and which is of a predetermined frequency which is different from the interrogating frequency of the interrogating signal, disconnecting the RFID circuitry and the antenna from each other to prevent the RFID circuitry from receiving the interrogating signal from the interrogating source so as to disable operation of the RFID tag.

5. A check comprising:
sheet material; and
a radio frequency identification (RFID) tag embedded in the sheet material during manufacture of the check, the RFID tag including (i) internal RFID circuitry, (ii) an antenna for receiving an interrogating signal of an interrogating frequency from an interrogating source, and (iii) means responsive to electromagnetic radiation of a predetermined frequency which is different from the interrogating frequency of the interrogating signal and for electrically connecting the RFID circuitry and the antenna to each other to allow the internal RFID circuitry to receive the interrogating signal from the interrogating source so as to enable operation of the RFID tag when electromagnetic radiation of the predetermined frequency which is different from the interrogating frequency of the interrogating signal is detected.

6. A check according to claim 5, wherein the means responsive to electromagnetic radiation of a predetermined frequency includes a phototransistor which turns ON in response to detecting a beam of light of the predetermined frequency which is different from the interrogating frequency of the interrogating signal.

7. A check according to claim 5, wherein the means responsive to electromagnetic radiation of a predetermined frequency includes a transistor which turns ON in response to the antenna receiving a tuned frequency which is of the predetermined frequency which is different from the interrogating frequency of the interrogating signal.

8. A check comprising:
sheet material; and
a radio frequency identification (RFID) tag embedded in the sheet material during manufacture of the check, the RFID tag including (i) internal RFID circuitry, (ii) an antenna for receiving an interrogating signal of an interrogating frequency from an interrogating source, and (iii) means responsive to electromagnetic radiation which is from a source external to the RFID tag and which is of a predetermined frequency which is different from the interrogating frequency of the interrogating signal and for electrically disconnecting the RFID circuitry and the antenna from each other to disable operation of the RFID tag when electromagnetic radiation from the source external to the RFID tag and of the predetermined frequency which is different from the interrogating frequency of the interrogating signal is detected.

9. A check comprising:
sheet material; and
a radio frequency identification (RFID) tag embedded in the sheet material during manufacture of the check, the RFID tag including (i) RFID circuitry other than circuitry external to the RFID tag, (ii) an antenna connectable to the RFID circuitry and for receiving an interrogating signal of an interrogating frequency from an interrogating source, and (iii) activatable means for, when activated in response to detecting electromagnetic radiation of a predetermined frequency which is different from the interrogating frequency of the interrogating signal, disconnecting the RFID circuitry and the antenna from each other to prevent the RFID circuitry from receiving the interrogating signal from the interrogating source so as to disable operation of the RFID tag;
wherein the activatable means includes a phototransistor which turns ON in response to detecting a beam of light of the predetermined frequency which is different from the interrogating frequency of the interrogating signal.

10. A check comprising:
sheet material; and
a radio frequency identification (RFID) tag embedded in the sheet material during manufacture of the check, the RFID tag including (i) internal RFID circuitry, (ii) an antenna for receiving an interrogating signal of an interrogating frequency from an interrogating source, and (iii) means responsive to electromagnetic radiation of a predetermined frequency which is different from the interrogating frequency of the interrogating signal and for electrically disconnecting the RFID circuitry and the antenna from each other which is different from the interrogating frequency of the interrogating signal to disable operation of the RFID tag when electromagnetic radiation of the predetermined frequency which is different from the interrogating frequency of the interrogating signal is detected;
wherein the means responsive to electromagnetic radiation of a predetermined frequency includes a phototransistor which turns ON in response to detecting a beam of light of the predetermined frequency which is different from the interrogating frequency of the interrogating signal.

* * * * *